Jan. 16, 1962 N. G. E. STEMME 3,017,611
ASSEMBLY FOR COUNTING MARKING IMPULSES
IN AN AUTOMATIC TELEPHONE SYSTEM
Filed June 27, 1957 2 Sheets-Sheet 1

INVENTOR
NILS GUSTAV ERIK STEMME
BY Hane and Nydick
ATTORNEYS

INVENTOR
NILS GUSTAV ERIK STEMME
BY Hane and Nydick
ATTORNEYS

United States Patent Office
3,017,611
Patented Jan. 16, 1962

3,017,611

AN ASSEMBLY FOR COUNTING MARKING IMPULSES IN AN AUTOMATIC TELEPHONE SYSTEM

Nils Gustav Erik Stemme, Bromma, Sweden, assignor to Telefonaktiebolaget LM Ericsson, Stockholm, Sweden, a corporation of Sweden Filed June 27, 1957, Ser. No. 668,501
Claims priority, application Sweden July 2, 1956
4 Claims. (Cl. 340—172.5)

Automatic telephone exchanges usually comprise one electrically operated, mechanical counter for each subscriber. When only local calls are to be counted, the counter is usually counting the number of calls. In automatic telephone systems which are adapted also to charge toll calls debited in dependence of both the duration and the distance, the counter is usually counting the number of units of time. For each unit is charged the same amount independent of the distance between the two subscribers, but the time duration of the units is then depending on the distance. The same kind of counters are used for local and toll calls. The counters are usually arranged close together as some kind of panel. For example quarterly all the counters of the panel are consecutively photographed on a photographic film and the subscriber number indicated on the cover of each counter and the count of the counter are photographically recorded. Then the counters are usually set back to zero.

The film, however, must be visually read and the content thereof must be manually transferred to a card or set up on an accounting machine or similar. This work is time wasting and errors may arise causing claims from the subscribers.

The invention enables the design of a period counter device for automatically recording, the number of accumulating periods of each of several subscribers in an automatically for example, mechanically readable form.

In the following, an embodiment of a period counter according to the invention will be described in connection with the attached drawings.

FIG. 3 consisting of FIGS. 3(*a*) and 3(*b*) shows an electromechanical device for feeding a magnetic tape step by step.

Figure 2:
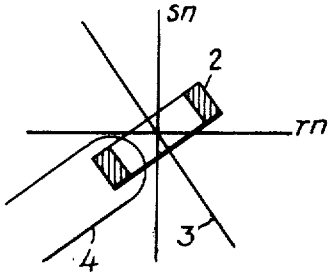
FIG. 2 is schematic diagram of how a ferromagnetic ring core is arranged in a register comprised in the counter.
Figure 4:
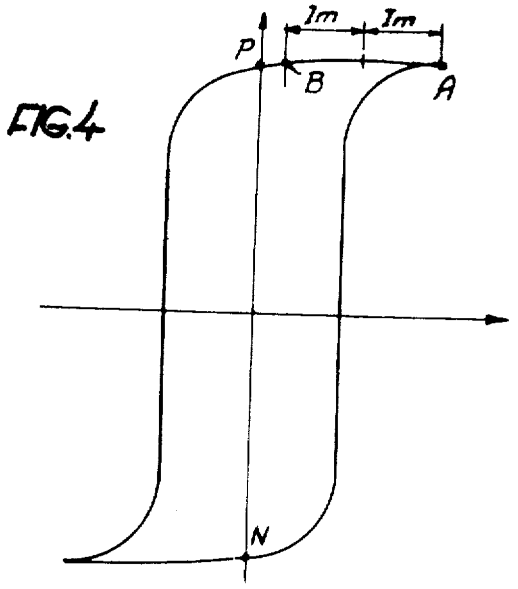

FIG. 4 shows a hysteresis loop of a core according to FIG. 2.

Figure 1:
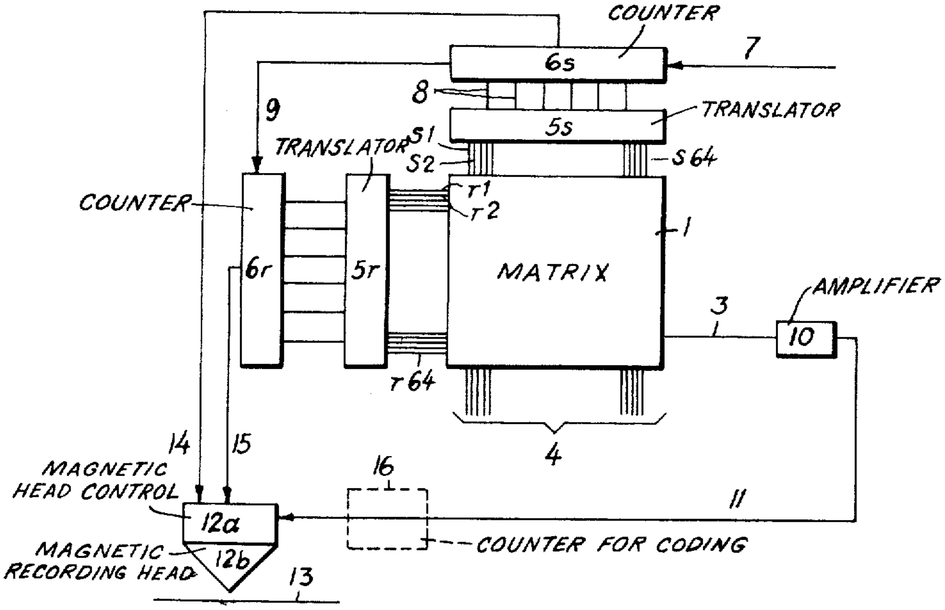
FIG. 1 shows a counter according to the invention.

FIG. 1 shows a magnetic core register. Registers of that kind are known and described for instance in "Proceedings of the I.E.E.," vol. 103, Part B, Supplement No. 2, "Convention on Digital Computer Techniques," pages 295–301 (April 1956), "A Digital Store Using a Magnetic Core Matrix." The matrix of such register comprises columns and rows, in the example described 64 columns and 64 rows forming totally 4,096 cross points. In each cross point there is a ring core 2 according to FIG. 2, which can be permanently magnetized. The columns and rows each correspond to an individual wire *s1*–*s64* and *r1*–*r64* respectively so that the columns wires and the row wires extend through each ring core, or comprise mutually series connected windings on each core, i.e. each core being provided with one row and/or one column winding. If both one column wire *sn* and one row wire *rn* are supplied with a certain current *Im* which is so selected that each current as such is insufficient to change the magnetic state of the ring core. The core 2, which is located in the cross point between the two wires, is magnetized with a resulting magnetizing current 2*Im*, which if the value of *Im* is suitably selected, will change the magnetic state of the ring core. The state, which is thus permanently changed, can for example represent the recorded data unit. Such registers or matrixes are commonly used for recording binary data i.e. for recording only two kinds of data elements viz. zeros and ones and the matrix 1 is adapted for such a binary recording. The recorded data can in a known manner be read by means of one single read wire 3, which extends through all cores as is described in the afore quoted "Proceedings of the I.E.E."

In the device according to the invention data are, however, recorded by means of particular marker wires. Each wire extends through one ring core, and may be wound several turns around the core, and each marker wire is connected to one subscriber. As long as a calling subscriber is continuing a telephone call, marker impulses are, in the same manner as in the known counter meters as described for instance in "Telephony" by W. E. Herbert and W. S. Procter, London, published by Pitman & Sons, 1932, page 389, transmitted to a marker wire, e.g. one single impulse for a local call, independent of the duration of the call, or otherwise impulses, the mutual time interval of which is substantially inversely proportional to the call distance viz. inversely proportional to the call price per minute. The shortest period, i.e. the shortest time interval between two marker pulses is usually constant, and it is of the magnitude 5–10 seconds, but it is often longer depending on the kind and extension of the telephone network.

When such a marking impulse is transmitted via the individual marker wire 4 of a subscriber to the ring core 2 of the subscriber, said core is magnetized. Such a core is, however, not suitable for an accumulating marker impulse counting operation, and thus the core must be read and information must be recorded at another place before the next marker impulse arrives at the matrix 1. In the following it is thus supposed that the cores are read once per second.

The counter device according to FIG. 1 is thus designed in the following manner. The column wires *s* and the row *r* of the register are each connected to the output of number translator 5*s* and 5*r* respectively of the type described for instance in "Digital Switching Circuits," Electronics, vol. 21, pages 110–118, September 1948. The impulse of both the number translators are connected to binary stepping impulse counters 6*s* and 6*r*, respectively, which are electronic stepping counters of a known kind described for instance by Burks, A. W., in "Electronic Computing Circuits" of the ENIAC, Proc. I.R.E., vol. 21, pages 756–767, August 1947. They operate in the following manner. The column counter 6*s* is once per second fed with 4,096 stepping impulses each 5 microseconds long and has six outputs 8 each connected with one of the six impulses of the number translator 5*s*.

Each output 8 represents a binary digit position in a binary number having six digits. The polarity or voltage level of the different outputs thus represents binary ones and zeros. When the first stepping impulse is supplied to the column counter 6*s*, the output voltages represent the binary number 000001; at the next impulse the number 000010 (i.e. the decimal digit 2); then the number 000011 (a decimal digit 3) and so on, so that the stepping selector is operating in the same manner as a conventional mechanical or electrical digit counter. The column stepping selector 6*s* has an additional output 9 for carry digits to the row counter 6*r*. When the capacity of the column counter 6*s* viz. 111111 (the decimal digit 63) is exceeded, a carry digit 5 is in the same manner as in standard calculators transferred to the row stepping selector 6*r*, which is counting the carry impulses on the wire 9 in a binary system in the same manner as the row counter is counting the stepping impulses on the wire 7. Thus, the two stepping selectors may be said to form a binary counter having a capacity of twelve digits. Said row 10 counter 6r counting the first six digits of the number (in the normal way of writing, the left half of the 12-digit number), while the column counter is counting the last six digits of the number.

Both the electronic number translators 5s and 5r each translate one of said 6-digit binary numbers to a digit according to the 64-number system in such a manner that the wire s1 receives a current 1m when the binary number 000000 is applied to the number translator. When the next binary number 000001 is applied, the conductor s2 is conducting current and so on. After the wire s64 becomes conducting as a consequence of the binary number 111111 being applied, said carry impulse is sent through the wire 9 to the row counter 6r which is stepped one step simultaneously with the zero-setting of the column counter 6s, causing the column wire s1 to be conducting again. Owing to the stepping action of the row counter the row conductor r2 is, however, now conducting instead of r1 as the number translator 5r operates in the same manner as the number translator 5s.

It is easily understood from the above that the ring cores are consecutively magnetized by the column and row wires so that the cores of the first row are first consecutively magnetized from the left to the right as shown in FIG. 1, whereupon the cores of the row r2 are magnetized and so on, until all $64^2=4{,}096$ ring cores have been magnetized. The whole process is repeated once per second.

In the present case the search operation described above is, however, not used for recording but for zero-setting (de-magnetizing or changing the polarity) the ring cores. A read impulse corresponding to a recorded marking impulse is obtained from the read wire 3 (FIG. 2) of a core only if a core is zero-set, which earlier has been magnetized by a marking impulse on the individual wire 4 thereof.

Each time the whole register is zero-set, i.e. once per second in the example described, a series of more or less irregularly appearing impulses are obtained on the wire 3, the relative time position of said impulses representing the subscriber number thereof. Supposing that 100 toll calls are continuing (a very high figure for 4,096 subscribers), and that each call as an average is initiating one impulse each ten seconds, ten marking impulses per second appear as an average on the wires (provided that the position of the marking impulses is not determined by an impulse generator common to all subscribers, in which case all the 100 impulses appear simultaneously on their respective marker conductors once each 10 seconds). The register is thus as an average recording 10 markings per second in each of ten cores 2 so that ten read impulses appear on the wire 3 each second, viz. when the register is read. Including the local calls it is common to calculate for a peak load of about 30 impulses per second for 4,096 subscribers.

The recording of a read impulse can, however, depending on the arrangement of the device, take a longer time, for example ten milli-seconds, than a zero-set or stepping impulse period (10 micro-seconds) while the whole register can be zero-set very rapidly, for example within 41 ms. for the whole register as will be shown in the following. As a core can be read only during a proceeding zero-set operation, either a very rapid magnetic tape recording is required during each individual reading operation, thereby requiring an expensive or complicated device, or the zero-setting register search must be stopped during the proceeding reading operation. In the example described the last mentioned method is applied as described in the following.

The read impulses on the wire 3 are amplified by an amplifier 10 and they are via a conductor 11 supplied, for example to an electronic gate circuit for instance of the type described in "Digital Switching Circuits," Electronics, vol. 21, pages 110–118, September 1948. The gate comprises a magnetic head control 12a and a magnetic recording head 12b and it is fed from the counters 6s, 6r by the binary numbers indicated by the counters, which numbers represent the ring core 2 read at a certain time and thus the corresponding subscriber number. The electronic gate is normally closed, but it is opened when a read impulse is applied via the conductor 11. The signals coming from the two counters via the conductors 14 and 15 respectively are then passed to the recording head 12b and are recorded on the tape.

Alternatively it may be possible to apply the following method. The individual time positions of the read impulses appearing on the conductor 11 represent those read cores, which contain a recorded marker impulses. It is thus possible to connect into the conductor 11 a counter 16 of the type known for instance from Burks, A. W., Electronic Computing Circuits of the ENIAC, vol. 35, pages 756–767, August 1947, and indicating the sequential number of the impulse which may be used as a code number defining the time position of the impulse. This coding apparatus is translating each read impulse to a coded signal indicating the time position of the read impulse and thus the subscriber number in question. In this case the conductors 14 and 15 may be eliminated.

It has already been stated above that the column counter 6s is fed once per second with 4,096 impulses each 5 micro-seconds long. Said stepping impulse can be generated with a uniform repetitious frequency i.e. the impulse frequency is 4,096 (except for the possible interruption in the impulse supply during a proceeding recording process on the tape 13). However, it may be more suitable to supply the 4,096 impulses with an impulse frequency of 100 kilocycles, whereby the interval between the impulses will be 5 milliseconds. Said 4,096 impulses thus appear during scarcely 41 milliseconds and then a pause is following, which is at least 959 milliseconds followed by 4,096 impulses and so on. This pause can be obtained in the following manner. Each time the row counter 6r is exceeding its capacity i.e. after 4,096 stepping impulses on the conductor 7, it is zero set, and it is transmitting a carry digit, which via a trigger circuit (not shown) is supplied to a gate in the conductor 7 causing the impulse supply to the column counter 6s to be interrupted. Said carry digit impulse is suitably used to block also both counters 6 simultaneously for the sake of security. Said trigger circuit is delivering blocking impulses having a duration of about 951 milliseconds, and it is thus determining the time interval between the repeated zero setting of the matrix 1.

The magnetic head control, however, does not need to record the binary 12-digit numbers on the tape 13, which are obtained from the counters 6 and correspond to subscriber numbers. It is namely possible to omit the conductors 14 and 15 and the gate or control head 12a and to record the read impulses directly on the tape. The mutual positions of said recorded impulses on the tape is namely indicating the subscribers' numbers in question and each recorded impulse as such represents the period marking, i.e. a marking impulse. In order to utilize the tape better it is possible to provide a relative motion between the magnetic recording head 12b and the tape 13 in the transversal direction of the tape, causing the magnetic head 12b to oscillate laterally in relation to the tape simultaneously as the tape is fed, possibly intermittently, so that a zig-zag path is recorded on the tape. If there are several matrices 1, for example 4 such matrices, it is possible to use four magnetic heads, which each record a longitudinal track on the tape.

However, the arrangement just described utilizes the tape rather unsatisfactorily. Thus it may be suitable, at least when the number of subscribers, large, to use the earlier described method to record the coded subscriber number on the tape, i.e. the binary number obtained from the counters 6 as soon as the read impulses is applied to the magnetic head 12*b*. This number can be recorded either according to the parallel or the series principle. In the former case the magnetic head 12*b* is provided with twelve channels and it is simultaneously recording all the digits of the binary number. Owing to the limited width of normal magnetic tapes there are usually arranged two groups, each having six recording elements, across the tape so that each record occupies two columns of transverse rows on the tape. A recording operation according to the series principle can take place in such a manner that the digits of the counters are sequentially arriving on the conductors 14 and 15, which are each connected to an individual recording element, so that two longitudinal tracks are recorded on the tape, each of said two tracks comprising one half of the recorded number. The gate 12*a* must, of course, be kept open during the time required for transferring six digit impulses.

When making a record according to the series principle, the tape is suitably fed only during a proceeding recording operation and it is then kept quiet. When a record is made according to the parallel principle, which is supposed to be used in all the cases described in the following, the tape is to be kept quiet during the recording process and it is to be fed, suitably 0.10 to 0.12 mm. between the recording operations.

If a conventional magnetic tape reel comprising 800 meters of the tape is used, it is easy to record 3,200,000 read impulses (12-digit binary numbers) on the tape without any risk of errors. Owing to the practical reasons described in the following it may be suitable to make all tape records twice on two separate tapes by means of two sets of magnetic heads.

The film strip comprising photographs of the subscriber numbers and making digits hitherto used may, of course, theoretically but not practically be automatically read. However, automatic reading is possible with magnetic tape described above, which tape without losing the advantages thereof can be replaced with a photographic film, a paper or plastic tape which is punched or some other known record member (said magnetic head 12*b* being then replaced by a corresponding recording member), as the arrangement according to the invention enables a code recording, which is not dependent on the individual form of certain, for example decimal numbers.

The mechanical reading of the tape, for example for automatically writing debiting bills for the subscribers can take place in the following manner, which, however, in principle is known from the art of electronic computers, and the known details thereof only briefly described.

There is a simple counter or register section for each subscriber number, for example in the shape of a series of magnetic cores or ferro-magnetic elements, a record row on a screen of a cathode ray tube utilized as a register, a rapid mechanical stepping selector, a track on a magnetic drum or band, or the similar. The tape is stepwise scanned in the same manner and with the same arrangement of the magnetic head as during the recording of the tape. Thus, different subscriber numbers are sequentially obtained, said numbers being expressed as binary numbers or being coded, and they each designate a marking period and are consecutively transferred to a register section. Each such section has a certain binary capacity so that the highest binary number which can be recorded corresponds to the highest number of marking impulses that may be expected from a subscriber during a certain long time, for example during a quarter year.

When a coded subscriber number is read the first time from the tape one single impulse is by means of a discriminating device, for example a number translator (not shown), fed to the matrix section corresponding to said number. Thus said number translator of the same kind as any of the number translators 5*s* and 5*r* described above. The register section now records the binary number "1." When the same number is repeated earlier or later on the tape and is read, it is again transferred to its matrix section and it now causes the content of said section to be transferred to an accumulator which is adding one to the recorded number which now becomes the binary number "10" (decimal 2) and is returned to the pertaining matrix section. When the same subscriber number is again repeated on the tape, the same process is repeated and one is recorded to the binary number 10 in the accumulator and the number is recorded as the binary number "11" (decimal 3) and so on. The same process is independently applied to all other recorded subscriber numbers in the matrix section co-ordinated therewith.

When the tape is read to the end, each matrix section indicates the number of recorded marking impulses for the subscriber number in question. Thus said matrix section corresponds to the mechanical counters hitherto used, except that they indicate the number of marking impulses, i.e. the number of periods to be debited to the subscriber in the form of binary electric, magnetic, mechanical, optical or similar states which can be easily read and transferred by means of machines. Of course, said states may also be trinary, decimal or similar, if the device is suited for such a number system. The important fact is that the arrangement is independent of the human eye or some other human sense for reading the information.

Said matrix section may in some known manner be connected to accounting or other statistical machines in order to sequently actuate a printing mechanism, commonly a rapid printing system, which with the aid of the subscriber number represented by the matrix section itself, is printing the name and address of the subscriber and which with the aid of the recorded, for example binary, number indicating the number of marking impulses is printing the amount to be debited, which is directly proportional to said number (for example 6 cents per marking impulse) on a bill form, on a post cheque form or similar provided with general pre-printed information. The recorded subscriber number may also be used for simultaneously printing an envelope for the form, if a transparent envelope is not used. Such machines are well known and hence a showing thereof is not necessary for the understanding of the invention.

In certain cases it may be suitable first to transfer the data obtained from the matrix section to punch cards and to use said cards for the automatic printing of bill forms.

By means of using a magnetic tape 13 or some other transportable record medium as described above, the advantage is obtained that also small telephone exchanges where an equipment for automatically printing bill forms or similar would be too expensive, can utilize the described automatic recording on a tape. Said tape is sent to a central station common to the whole country or a major part thereof which is provided with the equipment described above for automatic debiting and said central station will perform the whole debiting and debt collecting work. In such a case there is, however, the risk that the tape will be damaged or lost or that the recorded information is erased by mistake. This is the reason why two tapes are simultaneously recorded as described above. One of the tapes remains at the local telephone exchange, until it has been ascertained that said spare record is unnecessary.

Of course, the tape cannot only be used for automatically printing bills but also for statistical purposes, and it can be stored (to answer possible claims as to wrong debiting) or similar.

In the preceding a specific device according to the invention has been described. However, the invention may be varied in a great many ways which can only be shortly referred to here, particularly as the practical requirements on such a device may vary to a great extent. There are for example telephone networks having one minute periods (one marking impulse per minute) and often there are networks having straight counting of the calls. In such a case the period or call counter device does not need to operate particularly rapidly for recording and scanning the marking impulses in the matrix. Counters, number translators and matrices may then comprise electromechanical means for example stepping selectors or relay selectors, relay translators and relay matrices, but it is to be noted that the matrix must be able to store several independent recordings (each co-ordinated with one subscriber). Instead of ferromagnetic cores or relays it is possible to use ferroelectric elements (electrets), electron tubes or transistors. Such devices are well known from the modern art of electronic computers and to a certain extent also from the modern art of automatic telephony. Relay matrices as well as common electromechanical counters are, of course, much more expensive than the magnetic core matrix described above, and they require a better supervision, but in certain cases they are more suitable for example when it is desired to obtain a visual reading or control.

It may be suitable to design the matrix 1 as a three-dimensional matrix having rows, columns and sub-columns requiring three stepping selectors 6 and three number translators 5. It is also possible to design a one-dimensional register having one single row and 4,096 columns. The binary stepping impulse counter 6 and the number translator 5 are then replaced by one single stepping selector having one input 7 for the stepping impulses and 4,096 outputs, each connected to an individual column wire. The row wires *r* are unnecessary in this case.

The marking impulses can be supplied via a second network of column and row wires similar to the wires *r* and *n*. Said second network is extending through the cores in the same manner as the zero set network, and it is outside the matrix connected to a number translator, counter or similar in accordance with the arrangement shape of the marking wires and impulses. Such arrangement is advantageous when the marking impulses are coded for example in the form of impulse groups which is rather common in the telemetering equipments described in the following.

When the recorded call periods are to be analyzed or utilized locally so that the intermediate recording on a transportable recording medium (magnetic tape) is unnecessary, the counter device according to FIG. 1 may be arranged for an accumulating recording, for example by means of replacing the magnetic cores of the matrix 1 with separate accumulating register element of an accumulator of the kind already described above in connection with the description of the operation for reading and analyzing the magnetic tape record. In this manner the matrix elements corresponding to the cross points between the column and row wires *s* and *r*, respectively, in FIG. 1 can record more than one marking impulse and thus they need not be scanned more often than for example each time the accumulating marking impulses thus recorded are to be debited to the subscribers.

Finally it is to be noted that a device according to the invention is particularly suitable not only for automatic telephone networks, but also for certain other purposes, such as telemetering the consumption of electrical power, water etc. of a number of subscribers. The consumption of electrical power is according to a system used telemetered either by means of marking impulses (measuring impulses), the impulse interval or what is the same in practice, the impulse frequency, said frequency being a measure of the power consumption. Coded measuring impulses are also used to an increasing extent, said coded impulses being translated in such telemetering equipments into single impulses (or double impulses having different polarity for preventing errors by means of statics) in the receiver, the impulses thus translated being usually, directly or after a further translation, recorded in the matrix in the same manner as is described for the marking impulses in a telephone system.

It is to be noted that the recording head 12*b* and the magnetic tape 13 within the scope of the invention can be replaced by a transmission line so that the subscriber number impulses passed by the control head 12*a* via a line or by wireless are transferred to the accumulating device described above. In an automatic telephone system such arrangement seems to be less suitable, at least when the distance is greater, than transmission by means of magnetic tape 13, but in telemetering equipments and many other kinds of equipments such arrangement can be very suitable. The arrangement involves that each of the single impulses (or double impulses having a positive and a negative part) coming from the 4,096 marking wires is translated to an impulse group containing twelve impulses by means of the device according to FIG. 1, which impulses can be transferred to the accumulating device either according to parallel principle via 12 channels corresponding to the channels of the magnetic tape 13, possibly with an additional control channel, or according to the series principle via one single channel, or possibly by means of mixed series and parallel transmission for example via 6 channels, which are used twice for each marking.

A device according to the invention may preferably, possibly after a suitable modification, also be advantageously used for controlling different kinds of equipments for example railway signalling and mine signalling systems where measuring and control impulses are utilized in the same manner as the marking impulses. In a railway signalling system it is for example possible to obtain a continuous control of all the signal and switch positions which are recorded for example on the magnetic tape 13. In the case of an accident or disturbed operation it is possible to ascertain with the highest degree of precision and at any subsequent time, the positions of signals and switches at a given time particularly if a timing signal is simultaneously recorded on the tape. Such a control record needs hardly be saved more than one day. It does not matter if the tape is rapidly used up, i.e. if the tape is fed one step per second or per five seconds no matter whether any switches or signals have changed their state or not. A clear signal (free way) can for example be indicated in the same manner as a proceeding long distance call, i.e. a railway signal set on "free way" generates one marking impulse per second or per five seconds. In the same way it is possible to control the radiation at different test points in atomic power plants remotely.

As is stated above, the magnetic tape 13 or a corresponding record should be stepwise fed either one step per reading impulse or a constant number of steps per time unit. In the above mentioned control system for railway signals it is for example possible to use both methods. The number fed to the magnetic head indicates the number of the signal or the switch in question and the real reading time. The time, however, needs neither to be coded in the number signal to be recorded or to be recorded separately on the tape. If the latter is regularly stepped forward, no matter if a reading impulse is appearing or not. Of course, also the time can be recorded on the tape.

Figure 3A:
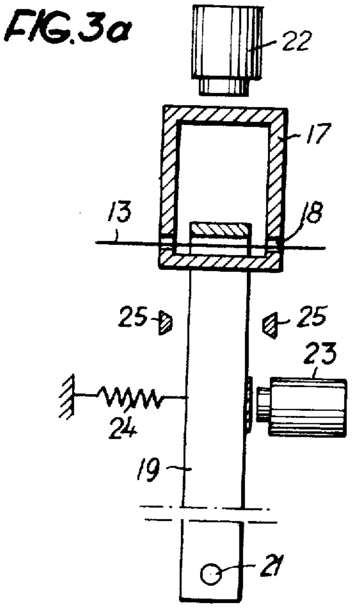
Figure 3B:
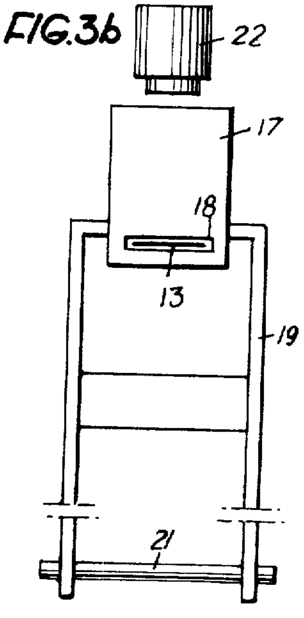

The magnetic head or another suitable recording must be fed by means of a simple, cheap and reliable mechanism, irrespective of whether the tape may be fed continuously or stepwise. A simple step feeding mechanism is schematically shown in the two figures of FIG. 3. FIG. 3*a* shows the mechanism seen from one side, partly in section. FIG. 3*b* shows the same mechanism seen in the direction of the arrow in FIG. 3*a*.

The tape 13 is guided through a slot 18 in a rectangular frame 17 made of a magnetizable, but not permanent magnetic material. Suspended from frame 17 is provided a rockable U-frame 19. The tape crosses the U-frame which is perpendicular as well to the frame as to the tape. The frame 17 can be attracted upwardly by means of electromagnet 22 and it is reset by the gravity. The U-frame 19 can be rocked about a pivot 21 by means of another electric magnet 23 and is reset by a spring 24. The magnet 23 is operated in time to the scanning of the register 1 (FIG. 1), so that it will obtain an impulse when a ring core is set zero irrespective whether the core has stored a recorded information or not. The movements of the U-frame 19 are limited by two stops 25 which are spaced a distance such that the bight of the bow U-frame which is located immediately above the tape 13, is moving a certain predetermined distance say about 0.1 or 0.12 millimeter. The magnet 22 is fed with the impulses to be recorded, possibly via an amplifier or an intermediate relay. Normally the tape 13 is not actuated by the rocking motion of the U-frame 19. Upon each reading impulse, i.e. upon each impulse to be recorded, which is passed to the tape, the frame 17 is lifted causing the tape to be clamped against the bight of frame 18 and to be fed one step for each reading impulse. By means of suitable devices, for example delay links, mechanical idle running transmissions, electrical trigger circuits or similar, it is easy to obtain that the tape is moving only during the time when the magnetic tape does not record any information. The read impulse may for example be applied to a trigger circuit of such a kind that the trailing edge of the read impulse is triggering the trigger circuit which is sending an impulse to the magnet 22 only after the read impulse, possibly via a further delay link and amplifier. Instead of the stepping mechanism described above it is, of course, possible to use almost any reliable simple and wear resisting feeding mechanism.

The above description of the counting device according to FIGS. 1 and 2 does not comprise certain details, which indeed are unnecessary for the understanding of the invention, but which may have some importance for the practical application of the invention.

As is stated above the details of the device need not be adapted to the binary number system although this system is most suitable. The differences will in fact not become particularly important, if the decimal system is used. In this case the counters 6 indicate the number of stepping impulses in the decimal system. Each of the two counters has not six binary digit sections, each having one single output 8, but two decimal sections each having ten digit outputs. The four sections of the two counters then together indicate units tens, hundreds and thousands. Thus the counter has a capacity of 10,000 (in fact 9,999) and the matrix can have the same number of cores. If a smaller number of cores than the total capacity of the counters is used, it is possible to provide automatic zero setting after all the cores have been scanned during the zero setting operation. Alternatively the two counters can be provided with 100 outputs each, so that they in fact will be arranged in a 100-digit system. The digit translator 5 must, of course, be designed for said number system.

As well as in electronic computers it is suitable to provide an automatic control of the markings on the tape 13. This is effected in a known manner. If said markings consist of 12-digit binary subscriber numbers, the number of binary ones of each number is counted before the recording operation. If the number is odd, a positive control impulse is generated and recorded on the tape together with the number itself. If the number is even, a negative control impulse is recorded. In the reading apparatus for the tape there is an arrangement, which controls, if said relation between the numbers of ones and the polarity of the control impulse is still valid. Otherwise an optical or electrical error signal appears. In telephone exchanges and devices for measuring power consumption it is usually of no importance, when a marking is missed or incorrect, as each marking represents a rather small amount. Of course, a negligible debiting error occurs but generally no accounting error. If there is a risk of a plurality of faulty markings it may be suitable to arrange such a control device which is rather simple and inexpensive. There are also several other well-known possibilities to control the operation.

Finally it should be noted that the device according to FIG. 1 is directly inducing an impulse in the read wire 3 for each marking impulse. This is directly seen from FIG. 2. If the marking impulses of all busy subscribers appear synchronously, for example if said impulses are derived from a common impulse generator, the register can be zero set during a time interval between the marking impulses so that the impulses induced in the read wire do not appear during a zero set operation and thus cannot disturb the function.

If the marking impulses, however, are not synchronized for different subscribers but appear on the wires 4 in random distribution, said induced impulses may act as read impulses and cause a faulty recording on the tape 13. In order to avoid such faulty recording the edges of the marking impulses should have a limited steepness, the limitation normally obtained by the tray capacitance being in most cases sufficient. If it is not so, the steepness of the edges can be limited for example by connecting a series inductance in the line common to the marker windings. Further it may happen that zero set impulses which are coincident at a certain core, partly or completely coincide with a marker impulse intended for the same core. Provided the marker current has its full value, the zero set impulses do not cause any flux change as the resulting magnetization can only magnetize the core from the point A to a point B which is located in the vicinity of the point P on the hysteresis loop of FIG. 4. This fact involves that no signal is obtained from the read wire, and thus no recording is made. As the core is left in the magnetic state corresponding to the point P, the marking remains to next reading cycle, when a recording is obtained. If, however, the coincident zero set impulses coincide with the edges, there is a certain but normally extremely small possibility of a faulty recording. This draw-back can, however, be avoided by simply taking out a derived (differentiated) signal via an impedance or transformer common to all marker impulse wires 4 which signal after amplification and clipping can be used for blocking the counter and the recording means. In this manner the further advantage is obtained that the edges of the marker impulses are limited as to the steepness. It is further to be noted that it is possible to obtain an integrated electric function (current or voltage) across a common impedance, for example a condenser connected in parallel with a resistor, said function being a measure of the marking frequencies and may for example be used for automatically controlling the zero set frequency in such a manner that it is increasing with a marker frequency.

I claim:

1. A device for counting marking impulses comprising a plurality of binary storage elements each having at least one input and an output and two alternative states, in one of said states an electrical read-out impulse applied to said input produces an electrical counting impulse on said output and in the other of said states no electrical impulse is produced by said read-out impulse on said output, each of said storage elements being adapted to be switched into said other state by a marking impulse and into said one state by a counting impulse, conductors for applying marking impulses to said binary storage elements, conductors for applying to said storage elements read-out impulses, at least one counting conductor for obtaining from said elements counting impulses respectively, means for generating read-out impulses, said binary storage elements being arrayed in a matrix and read-out impulses being applied periodically to the input of successive binary storage elements in said matrix, counting means for counting successive read-out impulses and indicating the sequential number of each read-out impulse within a read-out period thereby indicating the identity number of the binary element read out by said impulse, translating means for applying said read-out impulses to input conductors of successive binary storage elements so as to obtain impulses from the output of all the elements being in said other state, the time period of the sum of the duration of said read-out impulses being less than the time period between two successive marking impulses, and recording means for registering the sequential number of said read-out impulse.

2. A device according to claim 1 and comprising a readable registering element, and registering means for registering the sequential number of the scanned binary elements on said registering element, said registering means having an input connected to said counting conductor and at least another input connected to said counting means so as to register the sequential number of the binary element momentarily scanned, in response to a counting impulse applied to the output from said matrix.

3. A device according to claim 1 in which said matrix is at least two dimensional and including rows and columns controlled by separate counting means and translating means.

4. A device according to claim 1 in which said registering means comprise a magnetic recording head and said registering element comprises a magnetic tape.

References Cited in the file of this patent

UNITED STATES PATENTS

| | | |
|---|---|---|
| 2,566,330 | Horwitz | Sept. 4, 1951 |
| 2,667,538 | Wright | Jan. 26, 1954 |
| 2,675,427 | Newby | Apr. 13, 1954 |
| 2,691,064 | Sheperd | Oct. 5, 1954 |
| 2,691,156 | Saltz | Oct. 5, 1954 |
| 2,700,148 | McGuigan et al. | Jan. 18, 1955 |
| 2,764,634 | Brooks et al. | Sept. 25, 1956 |
| 2,772,370 | Bruce | Nov. 27, 1956 |
| 2,782,256 | Malthaner | Feb. 19, 1957 |